United States Patent [19]

Schafft et al.

[11] 4,134,384
[45] Jan. 16, 1979

[54] WIRE SAW WITH ROTATABLE GUIDE SLEEVE

[75] Inventors: Hugo W. Schafft, Des Plaines; Ernest Jaanson, Arlington Heights, both of Ill.

[73] Assignee: Motorola, Inc., Schaumburg, Ill.

[21] Appl. No.: 833,846

[22] Filed: Sep. 16, 1977

[51] Int. Cl.² ............................................. B28D 1/08
[52] U.S. Cl. .................................................... 125/21
[58] Field of Search ...................... 125/16, 21; 29/130; 242/118.32, 157 R; 226/191

[56] References Cited

U.S. PATENT DOCUMENTS

| | | | |
|---|---|---|---|
| 2,369,635 | 2/1945 | Bacon | 29/130 |
| 2,374,194 | 4/1945 | Grupe | 29/130 X |
| 3,034,743 | 5/1962 | Hill | 242/118.32 |
| 3,478,732 | 11/1969 | Clark | 125/21 |
| 3,771,206 | 11/1973 | Brown | 29/130 |
| 3,831,576 | 8/1974 | Mech | 125/16 R |

*Primary Examiner*—Harold D. Whitehead
*Attorney, Agent, or Firm*—Rolland R. Hackbart; James W. Gillman

[57] ABSTRACT

A rotatable sleeve for guiding at least one strand of wire, for example, includes a tubular outer member bonded to a tubular, dimensionally stable inner member which is press fitted onto a rotatable shaft. Dimensional stability is imparted from the inner member to the outer member which undergoes radial stress from the wire strand. For spacing a plurality of wire strands at a predetermined distance from one another, grooves are machined into the outer member of the rotatable sleeve. A further feature provides another tubular member inside the inner member for optimizing the press fit of the rotatable sleeve to the shaft.

5 Claims, 4 Drawing Figures

U.S. Patent     Jan. 16, 1979     4,134,384
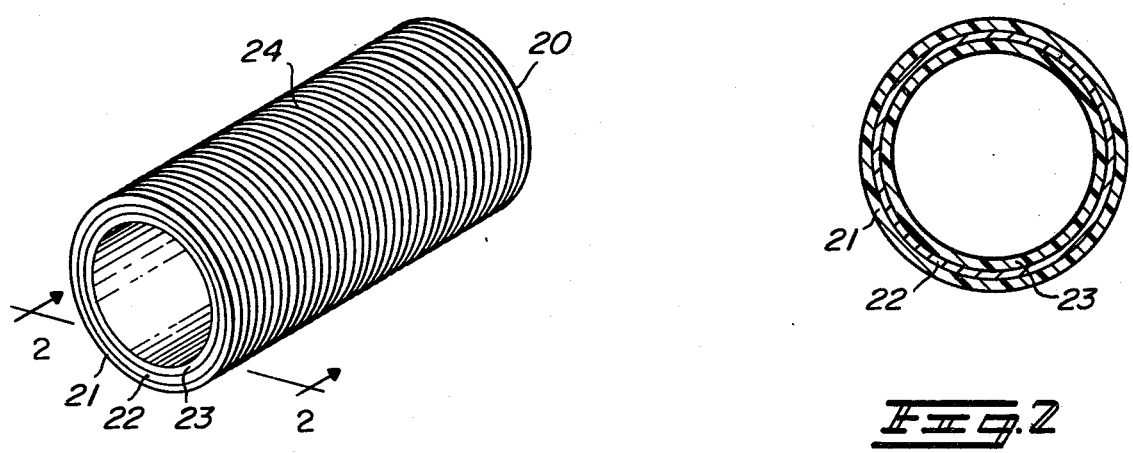
Fig.1
Fig.2
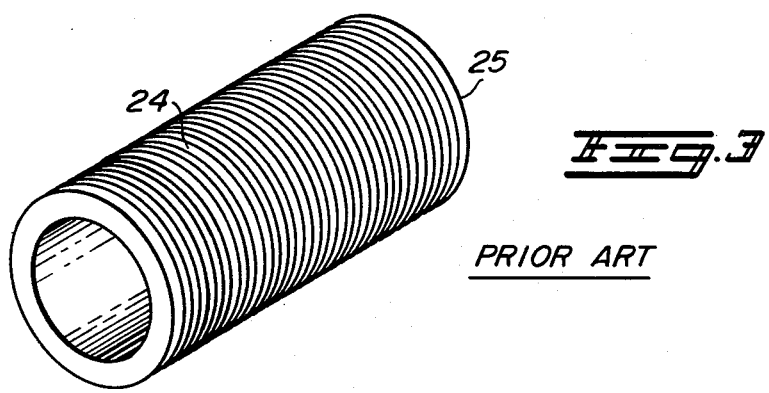
Fig.3
PRIOR ART
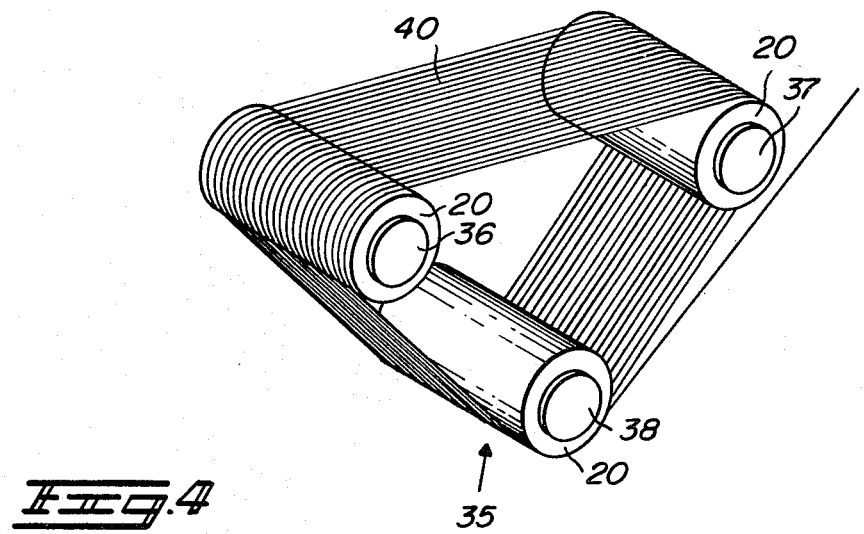
Fig.4

WIRE SAW WITH ROTATABLE GUIDE SLEEVE

BACKGROUND OF THE INVENTION

1. Field of the Invention

This invention relates to a rotatable guide sleeve, and more particularly, to an improved rotatable sleeve for guiding wire strands over a rotatable shaft and the like.

2. Description of the prior art

In the prior art, rotatable sleeves for guiding a plurality of wire strands are typified by those used in material cutting machines having a web with a plurality of wires. Rotatable sleeves with grooves for spacing the plurality of wires a predetermined distance from one another are provided in the material cutting machine on a plurality of elongated, parallel, cylindrical rotatable shafts. The plurality of wires between the shafts form a web or wires, wherein a predetermined portion of the web defines a cutting area. Prior art guide sleeves, which are press fitted to the shafts are made of a synthetic material, such as plastics, into which the plurality of grooves are machined. The accuracy of the wire-cutting machine is due to the precise spacing of the wires by the grooves of the rotatable sleeves.

During the cutting operation, the rotatable sleeve is subjected to radial stress by the web of wires which causes transverse expansion and eventually cold flow of the synthetic sleeve into a distorted shape. The dimensional instabilities of the synthetic sleeve result in a considerable deterioration of the cutting accuracy of the material cutting machine after a relatively short period of time. Stress relaxation and fluctuations in operating temperatures may also cause dimensional instabilities in the synthetic sleeve. To maintain the accuracy of the material cutting machine, the synthetic sleeve on the shafts must be periodically changed.

In order to improve the dimensional stability of the rotatable sleeve relatively hard plastics have been used. However, hard plastics have a much lower abrasion resistance than softer plastics and therefore tend to wear out quickly.

For the foregoing and other shortcomings and problems, there has been a long felt need for an improved rotatable guide sleeve.

SUMMARY OF THE INVENTION

Accordingly, it is an object of the present invention to provide an improved rotatable sleeve for guiding one or more wire strands that is dimensionally stable under radial stress.

It is a further object of the present invention to provide an improved rotatable sleeve for guiding one or more wire strands that exhibits a high degree of abrasion resistance.

It is a still further object of the present invention to provide an improved rotatable sleeve for guiding a plurality of wire strands that accurately spaces them a predetermined distance from one another.

It is yet a further object of the present invention to provide an improved rotatable sleeve for guiding one or more wire strands that has a longer usable life than prior art rotatable sleeves.

In accordance with the present invention, the aforementioned problems and shortcomings of the prior art are overcome and the stated and other objects are attained by an improved rotatable sleeve adapted to guide at least one strand of material, for example, wire strands, which includes a tubular, dimensionally stable inner member, a tubular outer member embracing the inner member, and means for imparting dimensional stability from the inner member to the outer member. The outer member, receiving its dimensional stability from the inner member can now be made of a less dimensionally stable material that possesses a high degree of abrasion resistance. Grooves are machined into the outer member for spacing a plurality of wire strands at a predetermined distance from one another. The rotatable sleeve can subsequently be fixedly mounted to a rotatable shaft or a similar device.

According to another feature of the invention, a rotatable sleeve adapted to guide a plurality of wire strands includes a tubular first member, a tubular dimensionally stable second member embracing the first member, a tubular third member embracing the second member and spacing a plurality of wire strands at a predetermined distance from one another, and means for imparting dimensional stability from the second member to the first and third members. The tubular first member, being less dimensionally stable than the second member, can be made of any practical material selected to enable a press fitted mounting of the rotatable sleeve to a rotatable shaft.

Additional features, objects and advantages of the rotatable guide sleeve in accordance with the present invention will be more clearly apprehended from the following detailed description together with the accompanying drawings.

BRIEF DESCRIPTION OF THE DRAWINGS

FIG. 1 is a perspective view of a rotatable guide sleeve in accordance with the present invention.

FIG. 2 is a sectional view taken substantially along the line 2—2 of FIG. 1.

FIG. 3 is a perspective view of a rotatable guide sleeve of the prior art.

FIG. 4 is a partial view of the material cutting machine showing a web with a plurality of wires between three elongated, parallel, cylindrical rotatable shafts.

DESCRIPTION OF THE PREFERRED EMBODIMENT

Referring now to FIG. 1, a rotatable guide sleeve 20 for use in a material cutting machine is illustrated that includes a tubular first member 23, a tubular, dimensionally stable second member 22 embracing the first member 23, and a tubular third member 21 embracing the second member 22. The rotatable guide sleeve 20 further includes a plurality of grooves 24 on the outer surface of the third member 21 for spacing a plurality of wire strands at a predetermined distance from one another. Means are provided for imparting dimensional stability from the second member 22 to the first and third members 23 and 21. For example, the members 21, 22 and 23 can be pre-formed of predetermined materials and then cemented together such that they are fixedly secured to one another. The rotatable guide sleeve 20 can also be constructed by casting the first and third members 23 and 21 onto the second member 22.

In FIG. 2, the cross sectional view illustrates more clearly one form of the present invention. The second member 22 is made of a dimensionally stable and hard material, for instance, a metallic material. The first and third members 23 and 21, receiving dimensional stability from the second member 22, can be made from a wide variety of materials which need not possess a high degree of dimensional stability or hardness. The materials for the first and third members 23 and 21 can be selected to have a high degree of abrasion resistance in order to increase the usable life of the rotatable guide sleeve. For example, the second member 22 is preferably made of a steel alloy, such as INVAR, and the first and third members 23 and 21 are preferably made of 95 shore "A" polyurethane. The INVAR is selected for its hardness, its low thermal expansion coefficient and its relatively low degree of transverse expansion when subjected to radial stress, as evidenced by its relatively low Poisson's ratio of approximately 0.30. The polyurethane is selected for its high degree of abrasion resistance. Although the polyurethane is relatively dimensionally unstable, as evidenced by its relatively high Poisson's ratio of approximately 0.45, the polyurethane is imparted dimensional stability by being fixedly secured to the second member 22. The polyurethane first and third members 23 and 21 are preferably cast to the second member 22 to provide an excellent bond between the INVAR and the polyurethane.

The dimensional stability imparted from the second member 22 to the first and third members 23 and 21 can be further enhanced by indentations or protrusions, such as longitudinal or radial ribs, on the surfaces of the second bushing 22. The protrusions provide additional coupling between the three members 21, 22 and 23 to further strengthen the bond and limit the transverse expansion of the first and third members 23 and 21 due to radial stress.

Next, grooves 24 are machined into the outer surface of the rotatable guide sleeve 20 for spacing a plurality of wires at a predetermined distance from one another. The grooves are precisely spaced so that the material cutting machine accurately cuts as many as two hundred wafers simultaneously from a piece of material, such as quartz, silicon, or ceramics. The thickness of the third member 21 is kept as thin as possible, while still accomodating the grooves 24, to decrease the volume of material and thus decrease the transverse expansion experienced when subjected to radial stress.

In FIG. 3, a prior art synthetic sleeve 25 is shown which is made of hard plastic, such as nylon, DELRIN or polyethylene. Grooves 24 are machined into the plastic sleeve 25 for spacing a plurality of wires at a predetermined distance from one another. The plastic sleeve 25, being made of one of the relatively hard plastics which have a relatively low degree of abrasion resistance, experiences significantly more wear than the rotatable guide sleeve 20 of the present invention. The plastic sleeve 25 is also relatively dimensionally unstable as compared to the rotatable guide sleeve 20 of the present invention. The plastic sleeve 25 undergoes transverse expansion when subjected to radial stress during the cutting operation and cold flows in the transverse direction after a relatively short period of use. The resultant transverse distortion of the plastic sleeve 25 causes considerable inaccuracy in the spacing of the plurality of wires, resulting in wafers that do not meet tolerance specifications. These and other problems of the prior art have been overcome by the improved rotatable guide sleeve 20 of the present invention.

Referring to FIG. 4, the rotatable guide sleeve 20 in accordance with the present convention can be advantageously utilized in a material cutting machine which has a web, generally designated 35, with a plurality of wires between elongated, parallel, cylindrical rotatable shafts 36, 37 and 38, wherein a predetermined portion of the web 35 defines a cutting area 40. Such a machine is more fully described in U.S. Pat. No. 3,824,982, entitled "Machine for Cutting Brittle Materials," by J. L. Bowman, U.S. Pat. No. 3,831,576, entitled "Machine and Method For Cutting Brittle Materials Using a Reciprocating Cutting Wire," by H. W. Mech, and U.S. Pat. No. 3,841,297, entitled "Machine for Cutting Brittle Materials," by H. W. Mech. In this machine a piece of material (not illustrated) is passed through the cutting area 40 to produce a large number of uniform wafers of predetermined thickness controlled by the spacing of the wires. For example, as many as two hundred wafers are simultaneously cut from a piece of material, such as quartz, silicon or ceramics. Rotatable guide sleeves 20 are press fitted onto the rotatable shafts 36, 37 and 38 and accurately space the plurality of wires in the web 35 at a predetermined distance from one another. The web of wires 35 subjects the rotatable sleeves 26 to radial stress and abrasive wear. Because of its improved dimensional stability and abrasion resistance, the rotatable guide sleeve 20 of the present invention has a usable life that is three to four times greater than that of prior art synthetic sleeves 25. The material cutting machine is not only more accurate but also more efficient with the rotatable guide sleeve 20 of the present invention since the time consuming process of changing the sleeves 20 is not required as often.

A rotatable guide sleeve 20 in accordance with the present invention can be generally applied to any device in which one or more wire strands are accurately guided over a pulley or the like. It is to be understood that, in practicing the present invention, only the second member 22 and the third member 21 need be included in the rotatable guide sleeve 20. In addition, any number of concentric tubular members can be included in the rotatable guide sleeve 20 without departing from the spirit and scope of the present invention.

The foregoing embodiments have been intended as illustrations of the principles of the present invention. Accordingly, other modifications, uses and embodiments can be devised by those skilled in the art without departing from the spirit and scope of the principles of the present invention.

What is claimed is:

1. In a machine for accurately cutting brittle materials, said machine having a web with a plurality of wires between a plurality of elongated, parallel, cylindrical rotatable shafts wherein a predetermined portion of the web defines a cutting area, the wires of the web being under a predetermined tension and undergoing reciprocating movements, a rotatable sleeve fixedly mountable by press fitting to each of the respective shafts comprising:

a first tubular member embracing each of the respective shafts;

a second tubular member embracing said first member; and a third tubular member embracing said second member and accurately spacing the plurality of wires of the web at a predetermined distance from one another, said second member being relatively harder than said and third members for imparting dimensional stability from said second member to said first and third members to substantially prevent transverse expansion of said third member in response to radial stress from the wires of the web.

2. The rotatable sleeve according to claim 1, wherein said second member is made of a steel alloy, said first and third members are made of polyurethane, and said polyurethane first and third members are cast onto said steel alloy second member.

3. The rotatable sleeve according to claim 2, wherein a plurality of grooves spaced at a predetermined distance from one another are machined into the outer surface of said polyurethane third member for spacing the plurality of wires of the web.

4. The rotatable sleeve according to claim 3, wherein said third member is relatively thin with respect to said first and second members.

5. The rotatable sleeve according to claim 4, wherein said third member is at least as thick as the depth of the grooves.

* * * * *